Patented Apr. 29, 1924.

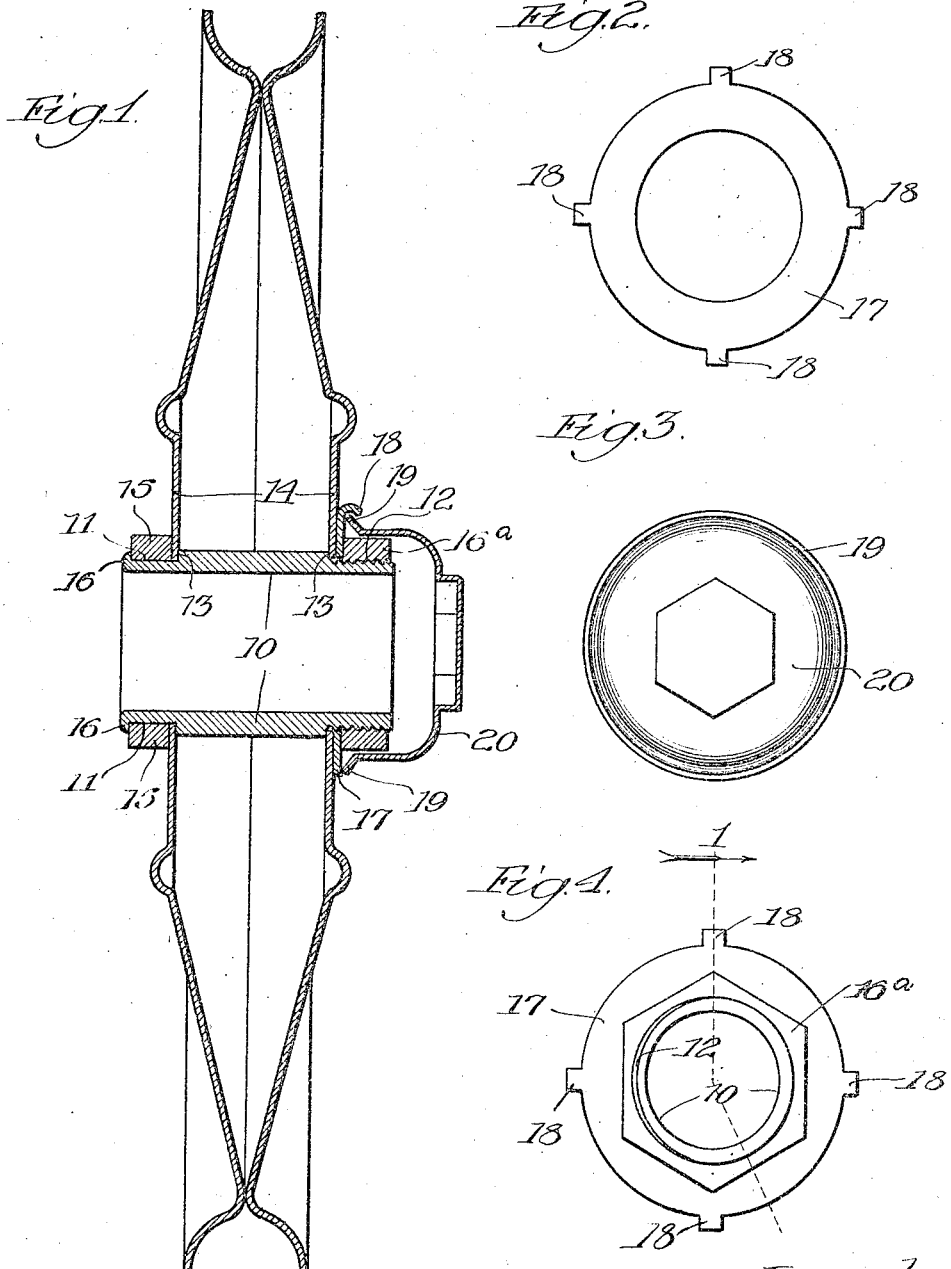

1,492,245

UNITED STATES PATENT OFFICE.

HOWARD J. FERRIS, OF HARVARD, ILLINOIS, ASSIGNOR TO HUNT-HELM-FERRIS & COMPANY, OF HARVARD, ILLINOIS, A CORPORATION OF ILLINOIS.

HUB CAP.

Original application filed October 16, 1922, Serial No. 594,998. Divided and this application filed February 8, 1923. Serial No. 617,761.

*To all whom it may concern:*

Be it known that I, HOWARD J. FERRIS, a citizen of the United States, residing at Harvard, in the county of McHenry and State of Illinois, have invented a new and useful Improvement in Hub Caps, of which the following is a specification.

This invention relates to hub caps and the like and is fully described in the following specifications and shown in the accompanying drawings, in which:—

Figure 1 is a section through a wheel, embodying the invention taken on the line 1—1 of Fig. 4.

Fig. 2 is a front elevation of a washer used for retaining the hub cap.

Fig. 3 is a front elevation of a hub cap.

Fig. 4 is a front elevation of the washer and of the nut which retains it on the wheel.

This application is a division of my application, Serial No. 594,998, filed October 16, 1922, Patent No. 1,459,527, granted June 19, 1923.

The embodiment illustrated comprises a wheel having a hollow cylindrical hub 10, the outer ends of which are reduced at 11 and 12, forming shoulders 13, which serve to space the disks 14.

The ring 15 fits snugly over end 11, the end then being turned back at 16 to retain it thereon.

The end 12 is threaded to receive the nut 16ª. A washer 17 is placed under this nut and has a plurality of ears 18, which are turned back, as shown in Fig. 1 over the flanged edge 19 of the hub cap 20, which is made large enough to surround the nut, without touching it.

In applying the hub cap over the hub of the wheel, two of the adjacent ears 18 may be bent up, if desired, before the hub cap is applied, the other two then being bent by a suitable tool, so as to retain the hub cap in place.

To remove the hub cap, it is necessary merely to insert a tool, as a screw driver, between the hub cap and two adjacent ears, 18, and spring them back sufficiently to permit the hub cap to be moved outwardly past them.

While I have shown and described but a single embodiment of my invention, it is to be understood that it is capable of many modifications. Changes, therefore, in the construction and arrangement may be made, which do not depart from the spirit and scope of my invention, as disclosed in the appended claims, in which it is my intention to cover all novelty inherent in the invention, as broadly as possible, in view of the prior art.

What I claim as new, and desire to secure by Letters Patent, is:

1. In combination, a hub the outer end of which is threaded, a washer slidable over said threaded end, a nut securing said washer on said threaded end, a hub cap surrounding said nut, and bendable means on said washer for engaging said hub cap to retain it on the hub.

2. In combination, a hub the outer end of which is threaded, a washer slidable over said threaded end, a nut securing said washer on said threaded end, a hub cap surrounding said nut and having an outwardly projecting flange on its edge, and bendable ears on said washer for engaging said flange to retain the cap on the hub.

3. In combination, a hub, the outer end of which has a shoulder and a reduced portion extending beyond the shoulder, a washer, means for securing said washer on said reduced portion, a hub cap surrounding said means and having an outwardly projecting flange, and bendable ears on said washer for engaging said flange of the hub cap to retain it on the hub.

HOWARD J. FERRIS.